(12) United States Patent
Montgomery

(10) Patent No.: US 12,417,263 B2
(45) Date of Patent: Sep. 16, 2025

(54) WEB BROWSER EXTENSION SCRIPT OBFUSCATION SYSTEM

(71) Applicant: Bank of America Corporation, Charlotte, NC (US)

(72) Inventor: Andrew Paul Montgomery, London (GB)

(73) Assignee: Bank of America Corporation, Charlotte, NC (US)

(*) Notice: Subject to any disclaimer, the term of this patent is extended or adjusted under 35 U.S.C. 154(b) by 985 days.

(21) Appl. No.: 17/171,615

(22) Filed: Feb. 9, 2021

(65) Prior Publication Data

US 2022/0253510 A1    Aug. 11, 2022

(51) Int. Cl.
*G06F 21/14* (2013.01)
*G06F 9/38* (2018.01)
*G06F 9/445* (2018.01)
*G06F 21/10* (2013.01)

(52) U.S. Cl.
CPC ............ *G06F 21/14* (2013.01); *G06F 9/3818* (2013.01); *G06F 9/445* (2013.01); *G06F 21/1066* (2023.08)

(58) Field of Classification Search
CPC ........ G06F 21/14; G06F 9/3818; G06F 9/445; G06F 21/1066; G06F 9/44526
See application file for complete search history.

(56) References Cited

U.S. PATENT DOCUMENTS

| 7,630,986 | B1 | 12/2009 | Herz et al. |
| 7,975,308 | B1* | 7/2011 | Satish ............... G06F 16/9535 713/161 |
| 8,200,962 | B1* | 6/2012 | Boodman ........... G06F 3/04842 713/176 |
| 8,549,298 | B2 | 10/2013 | Rouskov et al. |
| 8,566,901 | B2 | 10/2013 | Kay et al. |
| 8,806,187 | B1* | 8/2014 | Vemula ............... H04L 67/306 713/150 |
| 8,843,820 | B1* | 9/2014 | Kay ..................... G06F 21/51 715/234 |
| 8,892,893 | B2* | 11/2014 | Horne ................... H04K 1/00 717/124 |
| 8,935,755 | B1* | 1/2015 | Kay .................... G06F 9/44526 726/4 |
| 8,949,771 | B2* | 2/2015 | Moskal .................. G06F 8/61 717/123 |
| 9,342,386 | B1* | 5/2016 | Sargent ............... G06F 16/9566 |
| 9,443,077 | B1* | 9/2016 | Dingle ................ G06F 21/566 |
| 9,578,044 | B1 | 2/2017 | Sharma et al. |

(Continued)

*Primary Examiner* — David Garcia Cervetti
(74) *Attorney, Agent, or Firm* — Banner & Witcoff, Ltd.

(57) ABSTRACT

A computing device comprising a web browser processes instructions to load, by the web browser, first executable code of a browser extension. The first executable code causes the web browser to load a file, wherein the file comprises file content and metadata. The web browser decodes second executable code from the metadata and processes the second executable code to extract obfuscated information embedded in the file content. The web browser extracts third executable code from the extracted obfuscated information and provides, to a user of the computing device, first browser extension functionality by processing the first executable code and second browser extension functionality by executing the third executable code.

20 Claims, 5 Drawing Sheets

(56) References Cited

U.S. PATENT DOCUMENTS

| | | |
|---|---|---|
| 9,691,051 B2 | 6/2017 | Rexer et al. |
| 9,692,787 B1* | 6/2017 | Warner .................... H04L 63/20 |
| 10,462,216 B1 | 10/2019 | Vysotsky et al. |
| 10,587,584 B2 | 3/2020 | Vikramaratne et al. |
| 11,960,598 B2* | 4/2024 | Gupta .................... G06F 21/568 |
| 2002/0082730 A1* | 6/2002 | Capps .................... H04N 21/40 |
| | | 348/E5.002 |
| 2005/0283609 A1* | 12/2005 | Langford ................ G06F 21/64 |
| | | 713/176 |
| 2008/0301701 A1* | 12/2008 | Khijniak ................. G06F 9/544 |
| | | 719/311 |
| 2009/0063868 A1* | 3/2009 | Granados ............... G06F 21/125 |
| | | 726/22 |
| 2009/0282485 A1 | 11/2009 | Bennett |
| 2010/0058353 A1* | 3/2010 | Turski .................... G06F 16/955 |
| | | 719/311 |
| 2010/0131838 A1* | 5/2010 | Palmieri ................ G06F 16/986 |
| | | 715/234 |
| 2010/0205618 A1* | 8/2010 | Gonzalez ................ G06F 9/451 |
| | | 705/30 |
| 2012/0218275 A1* | 8/2012 | Wu ...................... G06F 21/6209 |
| | | 382/232 |
| 2013/0117716 A1* | 5/2013 | Stevens ................. G06F 16/954 |
| | | 715/841 |
| 2013/0232506 A1* | 9/2013 | Mazzoni ................. G06F 9/542 |
| | | 719/313 |
| 2013/0283139 A1* | 10/2013 | Claux .................... H04L 67/02 |
| | | 715/205 |
| 2013/0305383 A1* | 11/2013 | Garralda ............. H04L 63/0407 |
| | | 726/26 |
| 2014/0208201 A1* | 7/2014 | Bustelo ................. G06F 40/143 |
| | | 715/235 |
| 2015/0281318 A1* | 10/2015 | Warner .................... H04L 67/02 |
| | | 709/217 |
| 2016/0117061 A1 | 4/2016 | Hodgart et al. |
| 2016/0205118 A1* | 7/2016 | Kim .................... H04L 63/1425 |
| | | 726/23 |
| 2016/0314301 A1* | 10/2016 | Johns .................... G06F 21/577 |
| 2017/0104814 A1* | 4/2017 | Dias ........................ H04L 67/02 |
| 2017/0257393 A1* | 9/2017 | De Barros .......... H04L 63/1416 |
| 2017/0357442 A1* | 12/2017 | Peterson .................. G06F 9/54 |
| 2018/0295137 A1 | 10/2018 | Zager et al. |
| 2019/0026341 A1* | 1/2019 | Chomakov ............ G06F 16/137 |
| 2019/0079780 A1* | 3/2019 | Coven ..................... G06N 5/02 |
| 2019/0188010 A1* | 6/2019 | Stockert .................... G06F 8/71 |
| 2019/0215304 A1 | 7/2019 | Yang et al. |
| 2019/0281059 A1* | 9/2019 | Chittampally ........ G06F 16/953 |
| 2020/0034335 A1 | 1/2020 | Boutnaru |
| 2020/0082124 A1 | 3/2020 | Pedersen |
| 2020/0089880 A1* | 3/2020 | De Los Santos Vilchez ............... G06F 21/564 |
| 2020/0162359 A1* | 5/2020 | Borkar .................... H04L 67/53 |
| 2020/0162471 A1* | 5/2020 | Borkar .................. H04L 63/102 |
| 2020/0193066 A1* | 6/2020 | Johns ...................... H04L 63/06 |
| 2020/0250316 A1 | 8/2020 | Rickerd et al. |
| 2020/0356661 A1 | 11/2020 | Stoletny et al. |
| 2020/0356679 A1* | 11/2020 | Cooke .................... G06F 21/10 |
| 2021/0034719 A1* | 2/2021 | Brown .................... G06F 21/14 |
| 2021/0185033 A1* | 6/2021 | Albisu ................ H04L 63/1483 |
| 2022/0014509 A1* | 1/2022 | Walters .................... H04L 63/20 |
| 2022/0222089 A1* | 7/2022 | Joshi .................... G06F 16/953 |
| 2022/0222338 A1* | 7/2022 | Gupta .................... G06F 21/554 |
| 2022/0237610 A1* | 7/2022 | Badal-Badalian ..... G06Q 20/12 |
| 2022/0253510 A1* | 8/2022 | Montgomery ....... G06F 9/44526 |
| 2024/0106636 A1* | 3/2024 | Nix ....................... H04L 9/0825 |

* cited by examiner

WEB BROWSER EXTENSION SCRIPT OBFUSCATION SYSTEM

BACKGROUND

A web browser may be configured to render content from web pages and other sources. In some cases, web browser extensions and/or web browser applications may be installed in the web browser to provide additional functionality and features to enhance a user's browsing experience. For example, browser extensions may provide additional functionality and features based on the content from the web pages rendered in the web browser. When delivered, the browser extension code or scripts may be delivered in a format that may be easily accessible and/or understandable to a human user. As such, the browser extension code may be easily accessed and, thus, vulnerable to reverse engineering. It may be desirable to provide systems and techniques to control actions related to the browser extensions.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with obfuscating or otherwise providing executable code for scripting functions in a format not easily understood by a human.

A computing device may process instructions of a web browser application, which in turn may processes instructions to load first executable code of a browser extension. The first executable code causes the web browser to load a file, wherein the file comprises file content and metadata. The web browser decodes second executable code from the metadata and processes the second executable code to extract obfuscated information embedded in the file content. The web browser extracts third executable code from the extracted obfuscated information and provides, to a user of the computing device, first browser extension functionality by processing the first executable code and second browser extension functionality by executing the third executable code.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

The above-described examples and arrangements are merely some example arrangements in which the systems described herein may be used. Various other arrangements employing aspects described herein may be used without departing from the invention.

Figure 1:
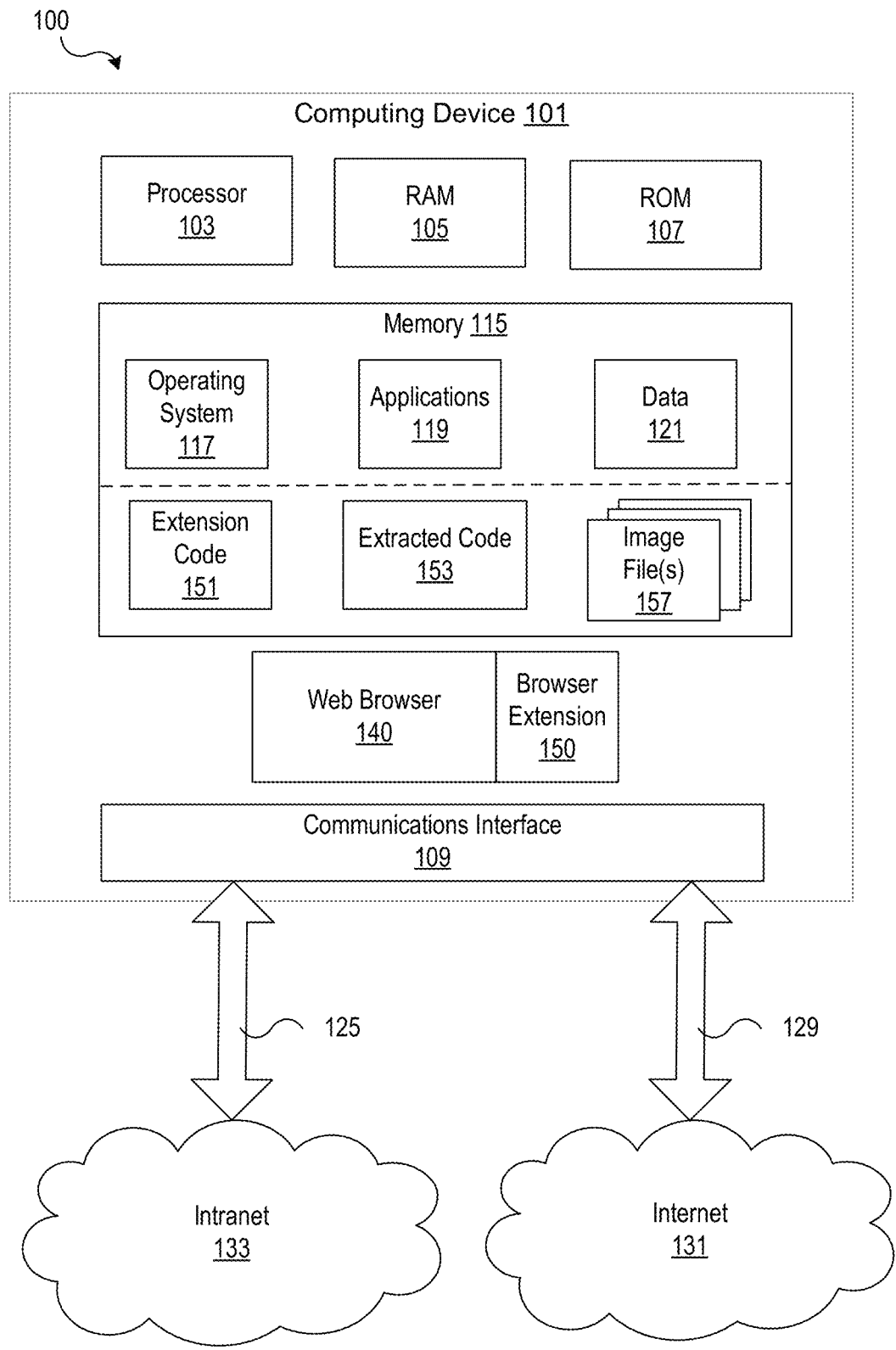
FIG. 1 shows an illustrative computing device processing obfuscated code for browser extensions in accordance with one or more aspects described herein.

FIG. 1 shows an illustrative computing device processing obfuscated code for browser extensions in accordance with one or more aspects described herein. The computing system environment 100 may be used according to one or more illustrative embodiments. The computing system environment 100 is only one example of a suitable computing environment and is not intended to suggest any limitation as to the scope of use or functionality contained in the disclosure. The computing system environment 100 should not be interpreted as having any dependency or requirement relating to any one or combination of components shown in illustrative computing system environment 100.

The computing system environment 100 may include a computing device 101 having a processor 103 for controlling overall operation of the computing device 101 and its associated components, including a Random Access Memory (RAM) 105, a Read-Only Memory (ROM) 107, a communications module 109, and a memory 115. The computing device 101 may include a variety of computer readable media. This computer readable media may be any available media that may be accessed by the computing device 101, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by the computing device 101.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on the computing device 101. Such a processor may execute computer-executable instructions stored on a computer-readable medium.

Software may be stored within the memory 115 and/or storage to provide instructions to the processor 103 for enabling the computing device 101 to perform various functions as discussed herein. For example, the memory 115 may store software used by the computing device 101, such as an operating system 117, one or more application programs 119, API functionality, and at least one associated database 121. In addition, some or all of the computer executable instructions for the computing device 101 may be embodied in hardware or firmware. Although not shown, the RAM 105 may include one or more applications representing the application data stored in the RAM 105 while the computing device 101 is on and corresponding software applications (e.g., software tasks) are running on the computing device 101.

The communications module 109 may include a microphone, keypad, touch screen, and/or stylus through which a user of the computing device 101 may provide input, and may also include one or more of a speaker for providing audio output and a video display device for providing textual, audiovisual and/or graphical output. The computing device 100 may also include one or more optical scanners (not shown).

The computing device 101 may operate in a networked environment supporting connections to one or more remote computing devices and/or computing systems, such as an internal network environment (e.g., an intranet 133) or an external computing network (e.g., the internet 131). In some cases, computing devices (e.g., hosts, servers, and the like) may provide content accessible via an application program of the one or more applications 119 or via a web browser 140.

The network connections depicted in FIG. 1 may include a Local Area Network (LAN) 125 and/or a Wide Area Network (WAN) 129, as well as other networks. When used in a LAN networking environment, the computing device 101 may be connected to the LAN 125 through a network interface or adapter in the communications module 109. When used in a WAN networking environment, the computing device 101 may include a modem in the communications module 109 or other means for establishing communications over the WAN 129, such as via a network 131 (e.g., public network, private network, Internet 131, intranet 133, and the like). The network connections shown are illustrative and other means of establishing a communications link between the computing devices may be used. Various protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

The web browser 140 (e.g., a browser application) may be executed by the processor 103 of the computing device 101 and may receive code (e.g., hypertext markup language (HTML) code, JavaScript, etc.) from a server (e.g., a remote server that hosts a website, a local server that hosts an intranet site, and the like) and may execute the received code on the device for the benefit of a user of the computing device 101. In some cases, the web browser 140 may include or be associated with one or more web applications (e.g., one or more of applications), where a web application may be configured to perform a single task or multiple tasks for a user. In such cases, the web application may be built using web technologies (e.g., JavaScript, cascading style sheet (CSS), HTML) and may be configured to be executed or interpreted by the web browser. Examples of web applications include games, photo editors, and video players that are run inside the browser.

Web applications may be hosted applications or packaged applications. Hosted applications may include at least a portion of a web site that itself includes web pages, plus some metadata that may be especially pertinent to the web application or to the user of the web application to allow the web application to perform some particular functionality for the user. Packaged applications may be web applications whose code is bundled, so that the user can download all of the content of the web application for execution, for example by the browser. A packaged web application may not need to have network access to perform its functionality for the user, and rather may be executed (e.g., by the browser) locally on the computing device without access to a network. Packaged web applications have the option of using application programming interfaces (APIs) (e.g., extension APIs) that may allow packaged applications to change the way the browser behaves or looks. In some cases, the web browser 140 may include or be configured with various plug-in components, such as themes, backgrounds, or add-ons. A plug-in may be a set of software components that adds specific capabilities to a larger software application. A theme or background may include a favorite image and color scheme for a browser application.

In various implementations, the web browser may include or be configured to interact with one or more browser extensions (e.g., the browser extension 150). The browser extension 150 may include executable code packaged or grouped together as a definable whole, and configured to extend the functionality to the web browser. Thus, extensions also provide extra functionality to a browser, but generally, unlike web applications, there is little or no user interface component to the functionality provided by a browser extension. Instead, browser extensions extend the functionality of the browser and the web sites being viewed in it. For example, browser extensions can extend the functionality of the browser by adding a new button to the address bar, such as a language translator. Buttons like this can also apply to the current web site being viewed—for example, clicking the translation button can convert all text, or selected text, on the website presented to a user into a language chosen by the user. In another example, an extension can be installed so that when a user hovers a cursor over a thumbnail image on a webpage executed by a browser a larger-size version of the image is displayed until the user moves the cursor away from the image. In another example, an extension may be installed to embed a "share" button (e.g., a social media sharing button) on a page or near a sharable link. Compared to web applications, extensions cut across websites and web applications. Extensions may be in effect across all websites (though some are site-specific). Web applications may not combine with other applications in this way. Rather, web applications generally run stand-alone, like any regular web site.

When installed, browser extension code may often be viewed within a browser window and/or via another application, such as a text editor. As such, trade secret or other proprietary information enabling specific functionality of the browser extension 150 may be visible to a user. As such, a need has been recognized for a way to obfuscate the browser extension code to protect proprietary functionality, such as browser security functionality. For example, an enterprise organization may desire to integrate browser communication security functionality within a browser extension. In this illustrative example, a computing device, such as a personal computing device, may include a browser extension integrated with a web browser. The browser extension may be stored as an application and/or as source code on a computer-readable media device of the computing device. The source code of the browser extension may be executed by the web browser. While web browsers commonly permit the use of browser extensions to modify the functionality of the web browsers, existing browser extensions lack capabilities to detect "man in the middle" (e.g., "man in the browser") interception from a malicious application (e.g., a middle agent) and prevent unauthorized data exposure to a third-party via the web browser. As such, a browser extension may be used to detect locally compromised client-server communications via a web browser and prevent exposure of sensitive information to an unknown third-party, as discussed in U.S. patent application Ser. No. 17/143,734 entitled "Web Browser Communication Validation Extension" and U.S. patent application Ser. No. 17/143,817, entitled "Browser Extension for Validating Communications", both of which are incorporated by reference in their entirety.

In the illustrative example of FIG. 1, the browser extension 150 may be installed as extension code 151 in a format familiar to programmers and other users, such as HTML, CSS, JavaScript and the like. In some cases, a portion of the extension code may be used to provide a public functionality, such as the aforementioned "translate" button, while different (e.g., private or hidden) functionality, such as browser communication security functionality, may be obfuscated such that the code enabling private functionality is hidden from casual viewing.

The extension code 151 may be installed, as a package, with one or more image files 157. The image files 157 may include enterprise logos, background images, icons, or other such images that may be expected to be used with the browser extension 150. For example, when installed and running, a browser extension may cause the web browser 140 to display the enterprise logo or other image as a background image for an open browser tab and/or a button image, a browser theme and/or the like. As such, the browser extension 150 may operate with a public functionality provided through the publicly viewable extension code 150 and displaying one or more of the image files 157.

As discussed herein, a steganographic file may contain content, such as image content audio content, and/or the like, where data is surreptitiously embedded within the file's image and/or audio content. For example, a common approach is to embed hidden data within an image of an image file (e.g., a portable network graphics (PNG) file, a joint photographic experts group (JPEG) file, and the like). In an illustrative method, the least significant bit of a pixel may be overwritten by an encrypted stream of secondary steganographic bits such that the primary public content of the image is not destroyed and/or distorted with notable artifacts. In some cases, the steganographic files may include additional information in metadata, comments, and the like. For example, PNG files and PEG files may contain comments where additional information corresponding to the image or image file is stored. Often, such comments may be used to store copyright, location or other information corresponding to the image or image file.

Figure 5:
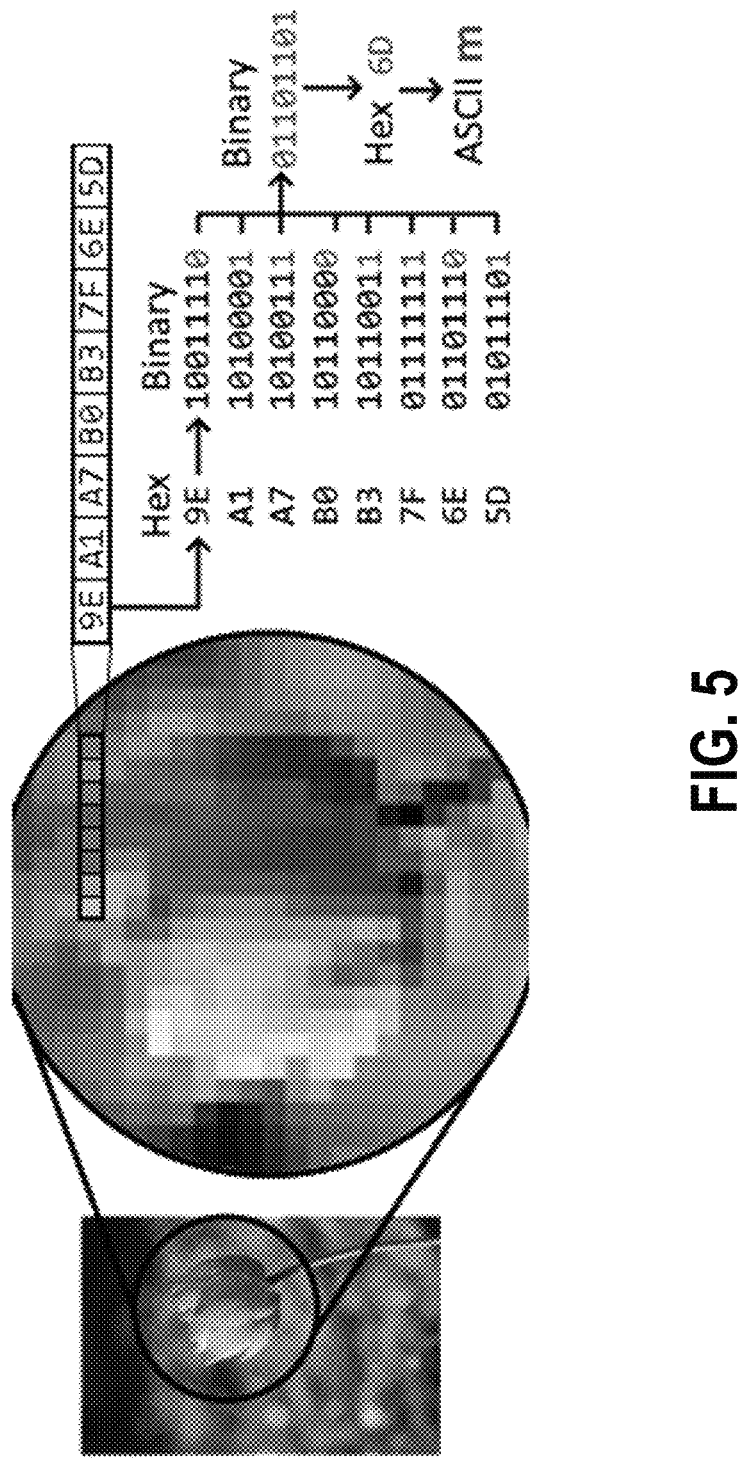
FIG. 5 shows an illustrative example of steganographic information included in an image.

Referring to FIG. 1, one or more of the image files 157 may include code encrypted using, for example, steganography, such as by using least significant bit (LSB) encoding. For example, FIG. 5 shows an illustrative example of steganographic information included in an image. Other steganographic encryption methods may be contemplated and/or other encryption methods may be used in addition to or instead of steganography. Also, while the image files 157 are illustrated, steganography may be used to encode information into other file types, such as audio files, text files, and the like. In some cases, comments or other metadata may be used to store additional executable code. These comments may be stored as simple text, encoded text corresponding to a binary or hexadecimal representation of characters. In some cases, the comments may also be encoded using LSB encoding to encode information in the least significant bit of a multiple characters in the comment of one or more of the image files 157, such as and American standard code for information interchange (ASCII) character. In some cases, one or more image files may have encoded browser extension information or executable code encoded in a comment and/or steganographically encoded in the image information. When the comment information and/or the steganographic information is extracted and/or decoded, such as into the extracted code 153, the browser extension 150 may execute the code to provide the private or hidden functionality of the browser extension.

Figure 2:
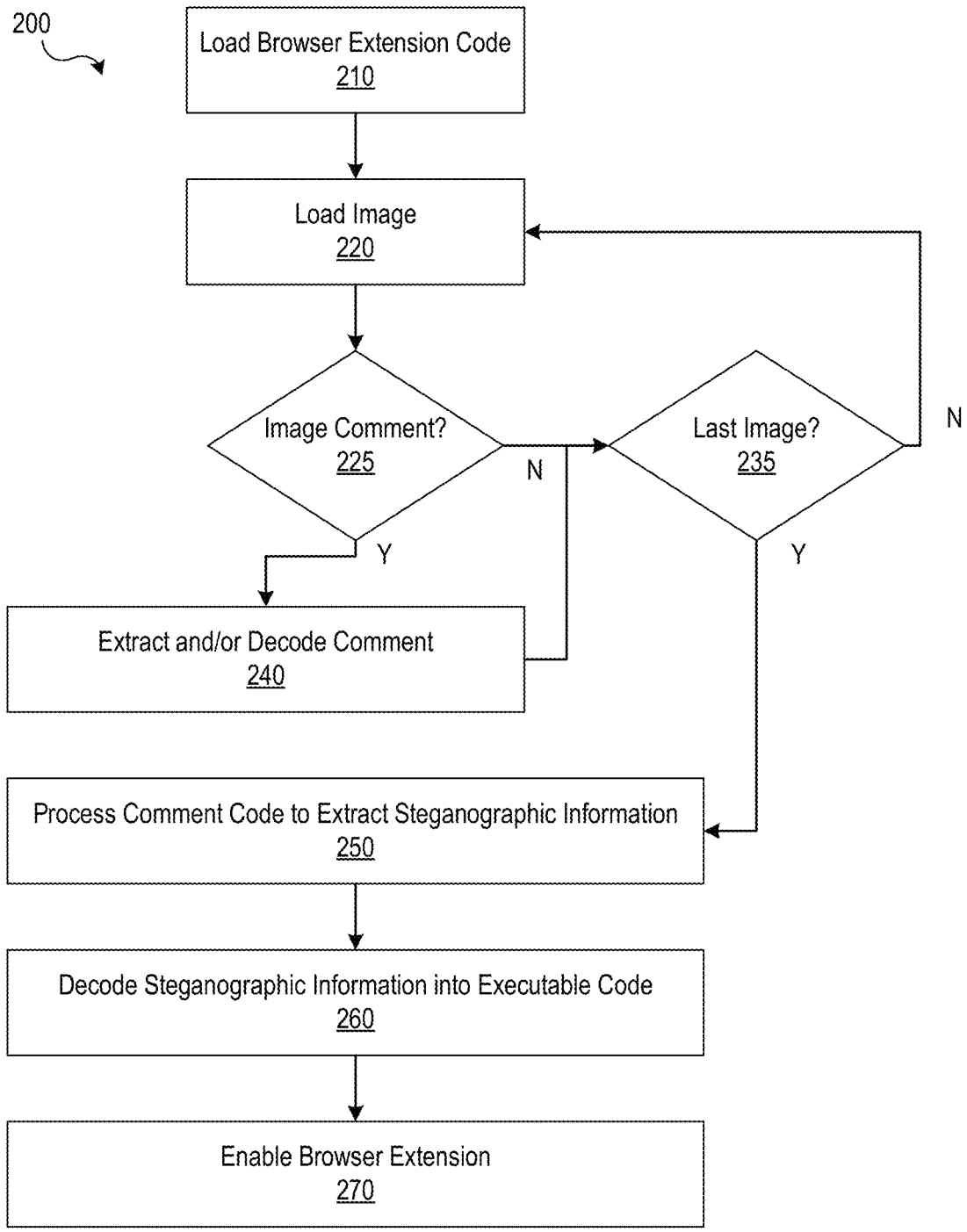
FIG. 2 shows an illustrative method for processing obfuscated code for browser extensions in accordance with one or more aspects described herein.

FIG. 2 shows an illustrative method 200 for processing obfuscated code for browser extensions in accordance with one or more aspects described herein. At 210, browser extension code 151 may be loaded and processed to initiate operation of the browser extension 150. The browser extension code 151 may include code to enable first functionality and may be stored in a form readable by a human. For example, the browser extension code 151 may include instructions that cause the browser extension 150 to provide functionality such as language translation for words or phrases presented on a web page, a visual theme for the browser extension, or other safe or innocuous functionality. In some cases, the browser extension code 151 may further load an image file at 220 to cause one or more images of the image files 157 to be displayed during normal operation. At 225, when loaded, the browser extension code 151 may analyze each image file to determine whether one or more of the image files 157 includes a comment and/or corresponding information loaded in the comment. If a comment is identified, the comment may be extracted and/or decoded at 240 and a determination may be made if a last image has been identified at 235. At 240, the processor may process a function of the browser extension code 151 to perform the extraction and/or decoding of the comment information. In some cases, the browser extension code 151 used to extract the image comment may be visible to a user. In some cases, this browser extension code 151 may be obfuscated from casual viewing, for example, by redefining or overloading a function. When extracted and/or decoded, the comment information may be used as extracted code 153 capable of extracting steganographic or other encoded information from one or more of the image files 157. In some cases, the steganographic or otherwise encoded information may be extracted from a same image file that included the comment. In some cases, the steganographic or otherwise encoded information may be extracted from a different image file that included the comment. In some cases, the steganographic or otherwise encoded information may be extracted from multiple image files of the image files 157.

If a comment is not associated with a particular image at 225, then the processor 103 may determine whether a last image file has been examined at 235. If not, the next image may be loaded at 220. If the last image has been identified at 235, the comment code may be processed to generate extracted code 153 at 250. At 250, the extracted code 153 from the comment may be processed to extract the steganographic information encoded in one or more of the image files 157. In some cases, the extracted comment code may also extract a private key from a same or different image to facilitate extraction of steganographic information. At 260, the extracted steganographic information may be processed into executable code and arranged into computer readable instructions capable of executing a non-public functionality of the browser extension 150. For example, the non-public functionality of the browser extension 150 may correspond to browser security functions such as analyzing browser communications to identify a potential man-in-the-middle malware or other malware installed on the computing device 101. At 270, the browser extension may be enabled to provide the public functionality (e.g., language translation, web browser theme functionality, and the like) and non-public functionality (e.g., security functionality) whose executable code is obfuscated from viewing by a human.

Figure 3:
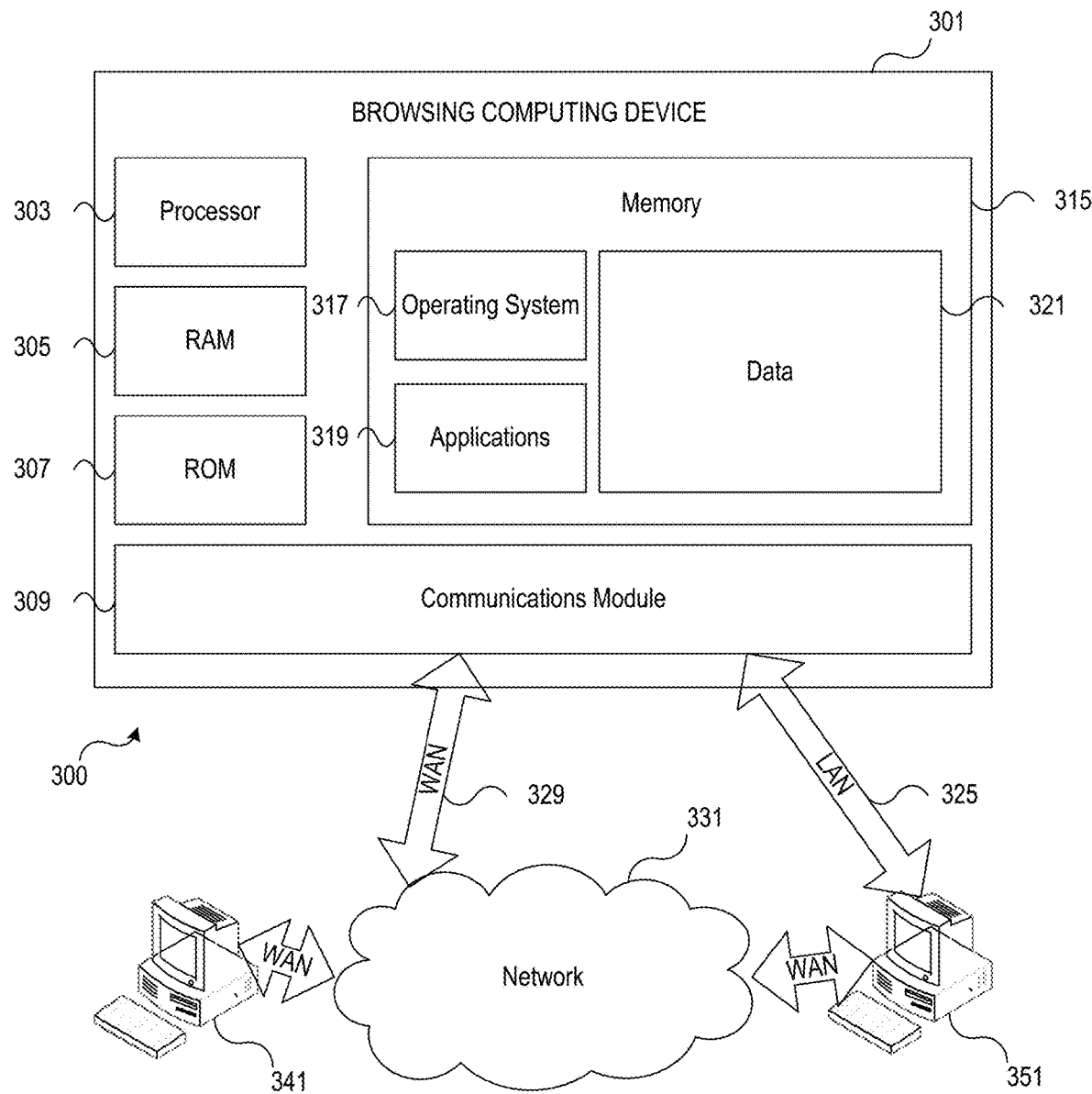
FIG. 3 shows an illustrative operating environment in which various aspects of the disclosure may be implemented in accordance with one or more aspects described herein.

FIG. 3 shows an illustrative operating environment 300 in which various aspects of the present disclosure may be implemented in accordance with one or more example embodiments. Referring to FIG. 3, a computing system environment 300 may be used according to one or more illustrative embodiments. The computing system environment 300 is only one example of a suitable computing environment and is not intended to suggest any limitation as to the scope of use or functionality contained in the disclosure. The computing system environment 300 should not be interpreted as having any dependency or requirement relating to any one or combination of components shown in the illustrative computing system environment 300.

The computing system environment 300 may include an illustrative browsing computing device 301 having a processor 303 for controlling overall operation of the browsing computing device 301 and its associated components, including a Random Access Memory (RAM) 305, a Read-Only Memory (ROM) 307, a communications module 309, and a memory 315. The browsing computing device 301 may include a variety of computer readable media. Computer readable media may be any available media that may be accessed by the browsing computing device 301, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by the browsing computing device 301.

Although not required, various aspects described herein may be embodied as a method, a computing (e.g., data transfer) system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed by the processor 303 of the browsing computing device 301. Such a processor may execute computer-executable instructions stored on a computer-readable medium.

Software may be stored within the memory 315 and/or other digital storage to provide instructions to the processor 303 for enabling the browsing computing device 301 to perform various functions as discussed herein. For example, the memory 315 may store software used by the browsing computing device 301, such as an operating system 317, one or more application programs 319 (e.g., a web browser application), and/or an associated database 321. In addition, some or all of the computer executable instructions for the browsing computing device 301 may be embodied in hardware or firmware. Although not shown, the RAM 305 may include one or more applications representing the application data stored in the RAM 305 while the browsing computing device 301 is on and corresponding software applications (e.g., software tasks) are running on the browsing computing device 301.

The communications module 309 may include a microphone, a keypad, a touch screen, and/or a stylus through which a user of the browsing computing device 301 may provide input, and may include one or more of a speaker for providing audio output and a video display device for providing textual, audiovisual and/or graphical output. The computing system environment 300 may also include optical scanners (not shown).

The browsing computing device 301 may operate in a networked environment supporting connections to one or more remote computing devices, such as the computing devices 341 and 351. The computing devices 341 and 351 may be personal computing devices or servers that include any or all of the elements described above relative to the browsing computing device 301.

The network connections depicted in FIG. 3 may include a Local Area Network (LAN) 325 and/or a Wide Area Network (WAN) 329, as well as other networks. When used in a LAN networking environment, the browsing computing device 301 may be connected to the LAN 325 through a network interface or adapter in the communications module 309. When used in a WAN networking environment, the browsing computing device 301 may include a modem in the communications module 309 or other means for establishing communications over the WAN 329, such as a network 331 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 4:
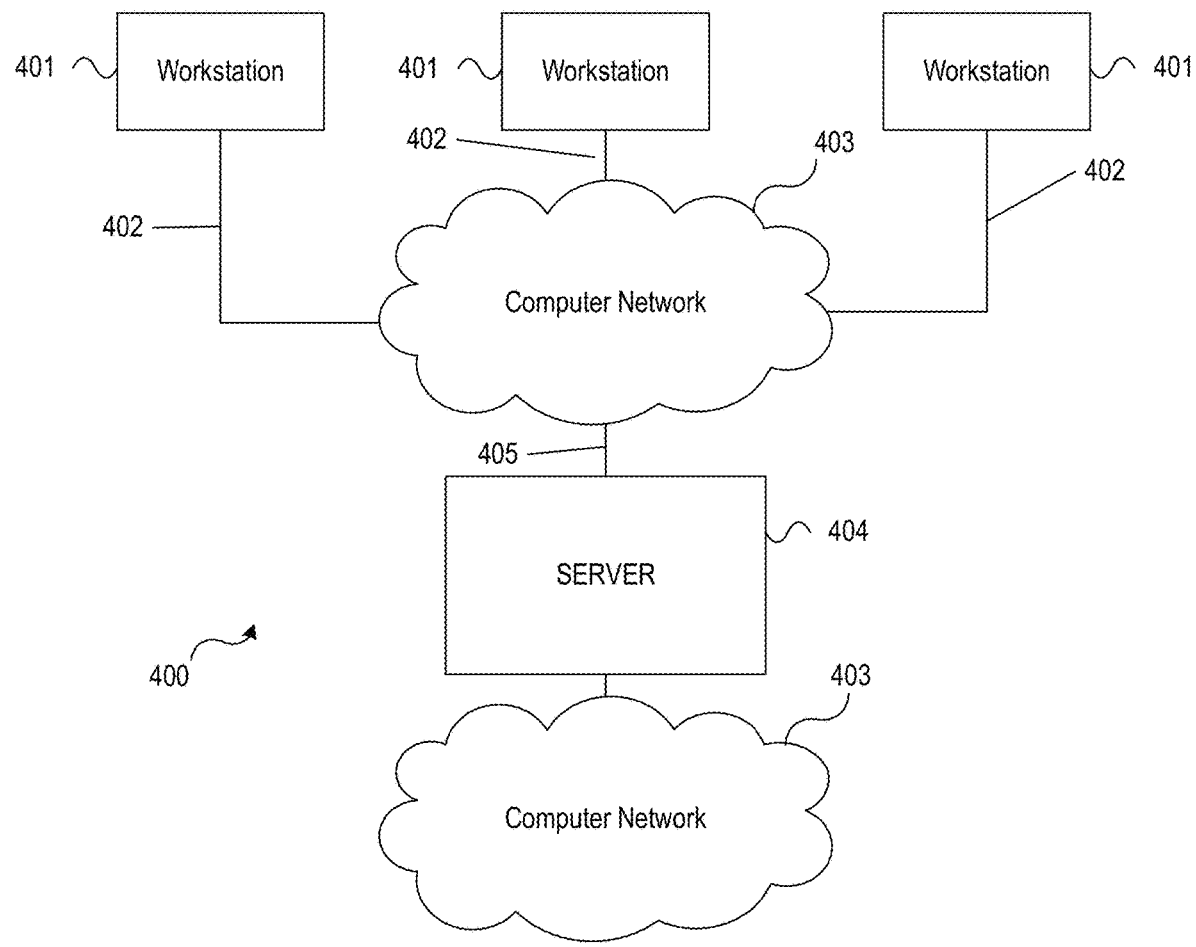
FIG. 4 shows an illustrative block diagram of workstations and servers that may be used to implement the processes and functions of certain aspects of the present disclosure in accordance with one or more aspects described herein.

FIG. 4 shows an illustrative block diagram of workstations and servers that may be used to implement the processes and functions of certain aspects of the present disclosure in accordance with one or more example embodiments. For example, an illustrative system 400 may be used for implementing illustrative embodiments according to the present disclosure. Referring to FIG. 4, as illustrated, the system 400 may include one or more workstation computers 401. The workstation 401 may be, for example, a desktop computer, a smartphone, a wireless device, a tablet computer, a laptop computer, and the like, configured to perform various processes described herein. The workstations 401 may be local or remote, and may be connected by one of the communications links 402 to a computer network 403 that is linked via the communications link 405 to the server 404. In the system 400, the server 404 may be a server, processor, computer, or data processing device, or combination of the same, configured to perform the functions and/or processes described herein. The server 404 may host local services and/or remote services. The server 404 may receive requests and send responses based on the protocol(s) associated with the local services and/or remote services.

The computer network 403 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. The communications links 402 and 405 may be communications links suitable for communicating between the workstations 401 and the server 404, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

The invention claimed is:

1. A computing device, comprising:
   at least one processor;
   a communication interface communicatively coupled to the at least one processor; and
   memory storing computer-readable instructions that, when executed by the at least one processor, cause the computing device to:

load, by a web browser, first executable code of a browser extension;

process, by the web browser, the first executable code to load a file, wherein the file comprises file content and metadata;

decode, by the web browser, second executable code from the metadata of the file;

extract, by the web browser by processing the second executable code, obfuscated information embedded in the file content;

decode, by the web browser, the obfuscated information to extract third executable code; and provide, by the web browser, first browser extension functionality by processing the first executable code and second browser extension functionality by executing the third executable code.

2. The computing device of claim 1, wherein the instructions, when executed by the at least one processor, cause the web browser to determine whether the file contents comprise encoded steganographic information.

3. The computing device of claim 1, wherein the instructions, when executed by the at least one processor, cause the computing device to extract, by the web browser processing the second executable code, the obfuscated information in the file content by causing the web browser to extract steganographic information from an image file using a least significant bit method.

4. The computing device of claim 1, wherein the file comprises an image file.

5. The computing device of claim 1, wherein the file comprises an audio file.

6. The computing device of claim 1, wherein the first executable code is visible to a user of the computing device.

7. The computing device of claim 1, wherein the third executable code is obfuscated to be unviewable by a user of the computing device.

8. A method, comprising:

loading, by a web browser, first executable code of a browser extension;

processing, by the web browser, the first executable code to load a file, wherein the file comprises file content and metadata;

decoding, by the web browser, second executable code from the metadata of the file and from comments in the file content;

extracting, by the web browser by processing the second executable code, obfuscated information embedded in the file content;

decoding, by the web browser, the obfuscated information to extract third executable code; and providing, by the web browser, first browser extension functionality by processing the first executable code and second browser extension functionality by executing the third executable code.

9. The method of claim 8, comprising determining whether the file contents comprise encoded steganographic information.

10. The method of claim 8, comprising extracting, by the web browser processing the second executable code, the obfuscated information in the file content by causing the web browser to extract steganographic information from an image file using a least significant bit method.

11. The method of claim 8, wherein the file comprises an image file.

12. The method of claim 8, wherein the file comprises an audio file.

13. The method of claim 8, wherein the first executable code is visible to a user of a computing device.

14. The method of claim 8, wherein the third executable code is obfuscated to be unviewable by a user of a computing device.

15. Non-transitory computer-readable media storing instructions that, when executed by a computing device comprising at least one processor, memory, and a communication interface, cause the computing device to:

load, by a web browser, first executable code of a browser extension;

process, by the web browser, the first executable code to load a file, wherein the file comprises file content and metadata;

decode, by the web browser, second executable code from the metadata;

extract, by the web browser by processing the second executable code, obfuscated information embedded in the file content;

decode, by the web browser, the obfuscated information to extract third executable code; and provide, by the web browser, first browser extension functionality by processing the first executable code and second browser extension functionality by executing the third executable code.

16. The non-transitory computer readable media of claim 15, wherein the instructions, when executed by the at least one processor, cause the web browser to determine whether the file contents comprise encoded steganographic information.

17. The non-transitory computer readable media of claim 15, wherein the instructions, when executed by the at least one processor, cause the computing device to extract, by the web browser processing the second executable code, the obfuscated information in the file content by causing the web browser to extract steganographic information from an image file using a least significant bit method.

18. The non-transitory computer readable media of claim 15, wherein the file comprises an image file.

19. The non-transitory computer readable media of claim 15, wherein the file comprises an audio file.

20. The non-transitory computer readable media of claim 15, wherein the third executable code is obfuscated to be unviewable by a user of the computing device.

\* \* \* \* \*